(12) United States Patent
Lyle et al.

(10) Patent No.: US 12,277,930 B1
(45) Date of Patent: *Apr. 15, 2025

(54) RECIPIENT CUSTOMIZED GENERATIVE VOICE MODELING

(71) Applicant: United Services Automobile Association (USAA), San Antonio, TX (US)

(72) Inventors: Ruthie Lyle, Durham, NC (US); Vijay Jayapalan, San Antonio, TX (US); Gregory B Yarbrough, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,926

(22) Filed: Mar. 21, 2024

Related U.S. Application Data

(63) Continuation of application No. 17/363,681, filed on Jun. 30, 2021, now Pat. No. 11,967,311.

(60) Provisional application No. 63/045,951, filed on Jun. 30, 2020.

(51) Int. Cl.
*G10L 15/22* (2006.01)
*G10L 15/18* (2013.01)
*G10L 25/63* (2013.01)

(52) U.S. Cl.
CPC .......... *G10L 15/1815* (2013.01); *G10L 15/22* (2013.01); *G10L 25/63* (2013.01); *G10L 2015/221* (2013.01)

(58) Field of Classification Search
CPC ............................ G10L 15/1815; G10L 15/22
See application file for complete search history.

(56) References Cited

U.S. PATENT DOCUMENTS 11,967,311 B1 * 4/2024 Lyle .................. G10L 15/22
2018/0286389 A1 * 10/2018 Kawachi ............ G10L 15/22
2019/0043472 A1 * 2/2019 Garcia ............... G10L 21/003

* cited by examiner

*Primary Examiner* — Ibrahim Siddo
(74) *Attorney, Agent, or Firm* — Potomac Law Group, PLLC; Dannon G. Allbee

(57) ABSTRACT

The present embodiments relate to on demand generation of curated audio content. Responsive to initiation of an electronic communication by a client, audio relating to a client speaking to the operator can be processed to derive a series of insights relating to features of the audio. Previously recorded audio relating to the operator can be combined with a text-based script to generate audio content. The audio content can be modified using the series of derived insights. The modified audio content can include a series of disclaimers that are played back to the client. Generation of the modified audio content can be dynamically generated responsive to detecting a trigger that allows for on-demand generation of the modified audio content.

20 Claims, 5 Drawing Sheets

RECIPIENT CUSTOMIZED GENERATIVE VOICE MODELING

CROSS-REFERENCE TO RELATED APPLICATION

This application is a continuation application of U.S. application Ser. No. 17/363,681 filed on Jun. 30, 2021, entitled "Recipient Customized Generative Vice Modeling", currently pending and which claims priority to U.S. Provisional Application No. 63/045,951, filed on Jun. 30, 2020, entitled "Recipient Customized Generative Vice Modeling," both of which are hereby incorporated by reference in their entirety for all purposes.

TECHNICAL FIELD

This disclosure is directed generally to audio content curation, and more particularly, to on demand generation of curated audio content.

BACKGROUND

Individuals communicate electronically to operators associated with an entity for various reasons. For instance, a customer of an entity (e.g., a bank) can contact an operator of the entity via a phone call to enroll in one or more products offered by the entity. During the communication, the operator can provide information to the client verbally. Additionally, in this conversation, the audio of the operator can include various characteristics of the voice and environment around the operator that are unique to the operator. For example, the operator may speak at a specific audio level, have background noise, speak at a specific speed/cadence, etc.

Further, in many cases, an operator during a conversation with an individual may provide mandated information to the individual. For example, the operator may read a series of disclosures or initiate a pre-recording of the disclosures to the individual responsive to determining that the disclosures are required (e.g., a specific product provided to the individual requires reading of the disclosures). In these cases, the reading of the mandated information may have different features/characteristics than that of the previous discussion with the operator. For example, a voice recording of the disclosures may include a different voice type, difference audio speed/cadence, volume level, etc., than that of the discussion with the operator. This may result in lower user experience.

Figure 1:
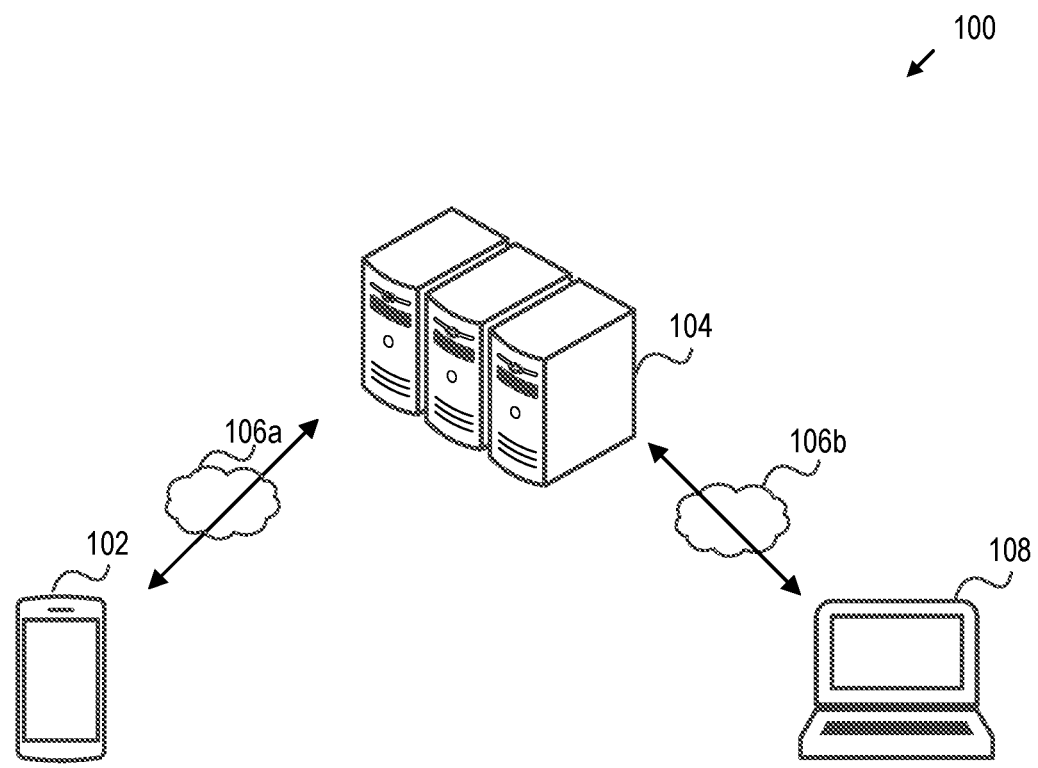
FIG. 1 is a block diagram of an example environment in which the present embodiments are implemented.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Customers call service providers for many reasons such as to obtain information, resolve bills, request new products. In some cases, the caller speaks with an interactive voice response (IVR) system or hears pre-recorded statements (e.g., specific disclosure statements). Listening to a monotone pre-recorded statement can be a bad experience for the user. To improve the user experience particularly with the pre-recorded statements, the present embodiments relate to generation of on demand curated audio content. As the caller speaks with the representative, the system can obtain insights about the caller (e.g., dialect, pace of speech, tone) and about the caller's environment (e.g., noisy background, location). Using real-time data, the pre-recorded statements can be altered to best suit the caller. The pre-recorded statement can be played in the voice of the representative so that the pre-recorded statement feels seamless.

More specifically, an insight module can analyze aspects of a communication between an operator of an entity (e.g., representative) and a client to identify various insights of the client (e.g., age of the client, emotional state, ambient noise level, cognitive capability, communication speed). A processing module can combine the insights identified on demand and audio content incorporating the voice of the operator to curate the audio content that corresponds to the insights relating to the client. Accordingly, the system can generate on-demand curated audio content that is customized using audio features (or insights) relating to the speech of the operator on demand (e.g., in real-time or near real-time).

The curated audio content can be generated using a generative voice model to model the audio with the voice of the operator. Further, the generative voice model may process the insights to customize the audio. For example, if the client has a noisy background when speaking to the operator, the generative voice model can generate audio content to include background noise that is similar to the detected noisy background of the client. As another example, if the insights identify that the operator and/or the client is an older individual or is hard of hearing, the playback of the audio content may be slowed.

The system as described herein can initiate insight generation and/or audio content customization responsive to detecting one or more triggers. For example, a trigger can include identifying that audio content is required for a conversation, identifying that the client has difficulty understanding the operator's voice (e.g., detecting that the client has said "what did you say"), detecting an indication from the operator to initiate generation of the customized audio content, etc.

Accordingly, the present embodiments can detect contextual features of the client and/or operator audio and generate curated audio content that is consistent with the detected contextual features. This can allow for playback of curated audio content that has features that match those of the operator's voice but are suited for the client and the client's environment. The playback of the curated audio content can increase user experience, as the user can better understand the disclaimer audio and comprehend the audio as the curated audio content matches the voice of the operator.

As an illustrative example, a client of an entity contacts the operator via a phone call, where the client is requesting to enroll in a product offered by the entity. During this call, the operator communicates to the client with various features (e.g., an emotional state, ambient noise, speech speed) relating to speech of the client. The system can process the client audio to detect the features of the audio.

In this example, upon a detection that disclaimer audio is to be provided to the client, the system can retrieve text (e.g., in a text-based script) and/or related audio corresponding to the text-based script. Further, the system can combine the disclaimer audio with previously-stored or generated voice data relating to the operator to generate modified disclaimer audio with the voice of the operator. Responsive to detecting a trigger to initiate the disclaimer audio, the system can modify/curate the disclaimer audio to incorporate the features specific to the operator. The system then can play back the modified disclaimer audio to the client. In this example, the modified disclaimer audio includes the curated audio content as described herein.

While generation of customized/modified disclaimer audio is primarily discussed as an illustrative example, the present embodiments are not limited to such an example. For example, the present embodiments can modify/customize a voice of an operator speaking to the client. As another example, the present embodiments can modify/customize any computer-generated voice to incorporate any voice and insights derived from participants in a conversation.

FIG. 1 is a block diagram of an example environment 100 in which the present embodiments are implemented. As shown in FIG. 1, the environment 100 can include a client device 102 comprising a device associated with a client. Client device 102 can include a network-accessible device (e.g., smart phone, computer, tablet, wearable device) capable of communicating data with other devices (e.g., network-accessible server system 104). For instance, the client device 102 can initiate a communication (e.g., phone call, email message, text message) to initiate communication with the entity operator device 108 and/or network-assessible server system 104 via networks 106a, 106b.

The environment 100 can include a network-accessible server system 104. Network-accessible server system 104 can include one or more interconnected computing devices (e.g., servers) capable of maintaining data and performing processing tasks as described herein. In some embodiments, the network-accessible server system 104 can generate modified audio (e.g., disclaimer audio) as described herein.

Devices in the environment 100 can communicate via networks 106a-b. Network(s) 106a-b can include suitable wired/wireless interfaces allowing for data communication between devices. The network(s) 106a-b can include personal area networks (PANs), local area networks (LANs), wide area networks (WANs), metropolitan area networks (MANs), cellular networks, the Internet, etc.

The environment 100 can include an operator device 108. The operator device 108 can include a device (e.g., a computer, smart phone) associated with an operator associated with the entity. For instance, the operator, via operator device 108, can communicate with the client via a phone call with the client device 102.

Figure 2:
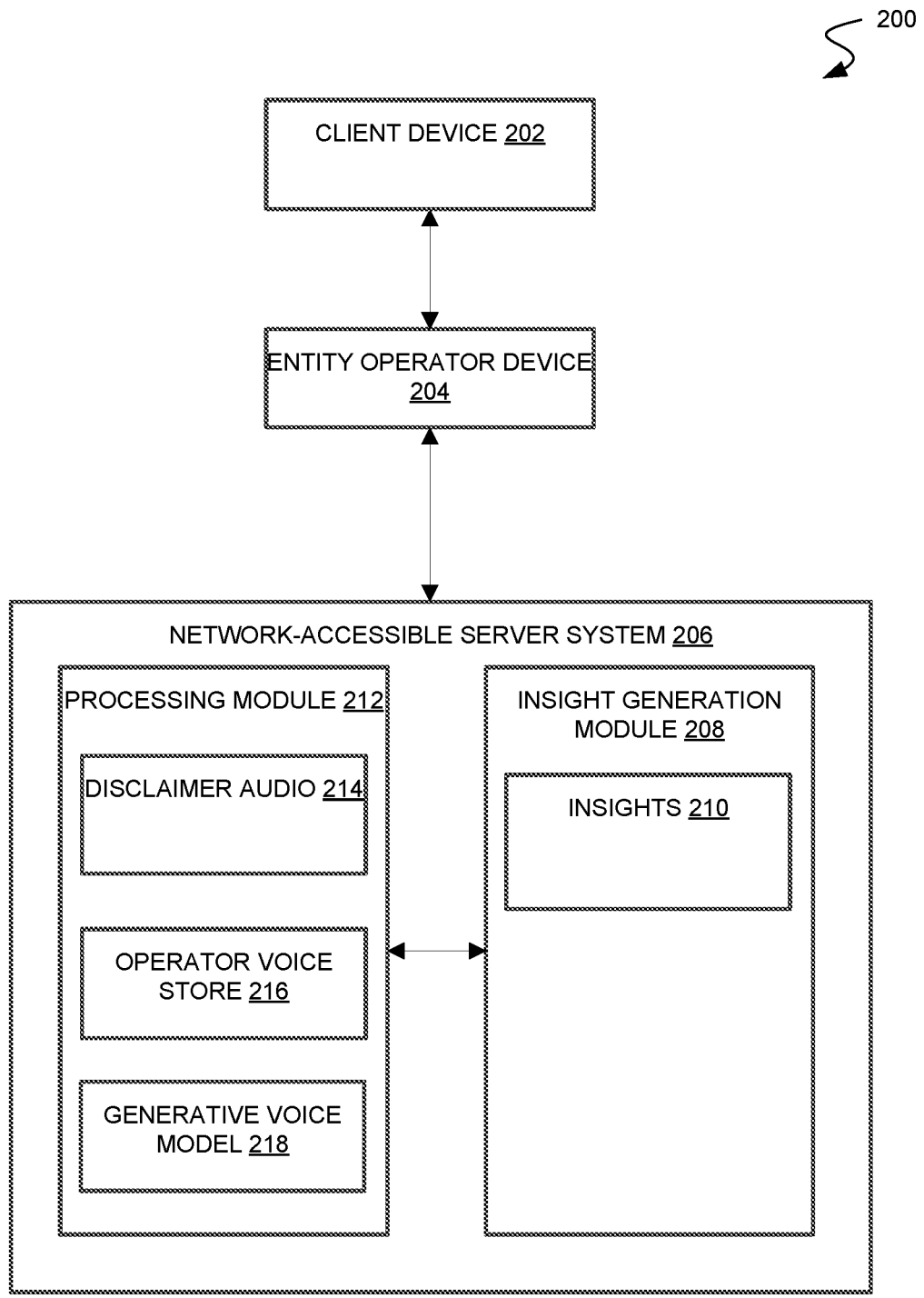
FIG. 2 is a block diagram illustrating an example architecture for generation of on demand curated audio content.

FIG. 2 is a block diagram 200 illustrating an example architecture for generation of on demand curated audio content. A client device 202 can initiate a communication (e.g., a phone call, internet communication) with the entity operator device 204. For instance, the client, via client device 202, can initiate a phone call with entity operator device 204 requesting to enroll with a product provided by the entity. In some embodiments, the entity operator device 204 initiates the call with the client device 202. During this call, specific information (e.g., a mandated disclosure) may have to be provided to the client via client device 202.

Accordingly, the network-accessible server system 206 can dynamically generate a curated audio content using client insights and, in some embodiments, the operator voice to provide to the client. The network-accessible server system 206 can include an insight generation module 208 and a processing module 212. The insight generation module 208 can process operator audio to derive insights into the operator audio. Example client insights derived from client audio can include an emotional state of the client, an audio volume, a background noise level, an age of the client, an accent of the client, etc. The insights can be stored as insights 210 and utilized in generation of curated audio content.

The processing module 212 can process the disclaimer audio 214, the operator voice store 216, and the insights 210 to generate curated audio content that incorporates the voice of the operator. The processing module 212 can identify and retrieve relevant disclaimer audio 214 and map the disclaimer audio 214 to words of the operator stored in the operator voice store 216. For instance, the operator voice store 216 can include a series of previously-generated voice data from the operator and associate a word/phrase with the data. The disclaimer audio 214 that includes the operator voice data can be modified using the insights 210 to generate the curated audio content. The curated audio content can be presented/played back to the client device 202.

The processing module 212 can include a generative voice model 218. The generative voice model 218 can process the insights 210 and disclaimer audio 214 to generate the curated audio content. The generative voice model 218 can use one or more rules to modify features of the disclaimer audio using the insights that incorporates features of the client audio into the curated audio content.

Figure 3:
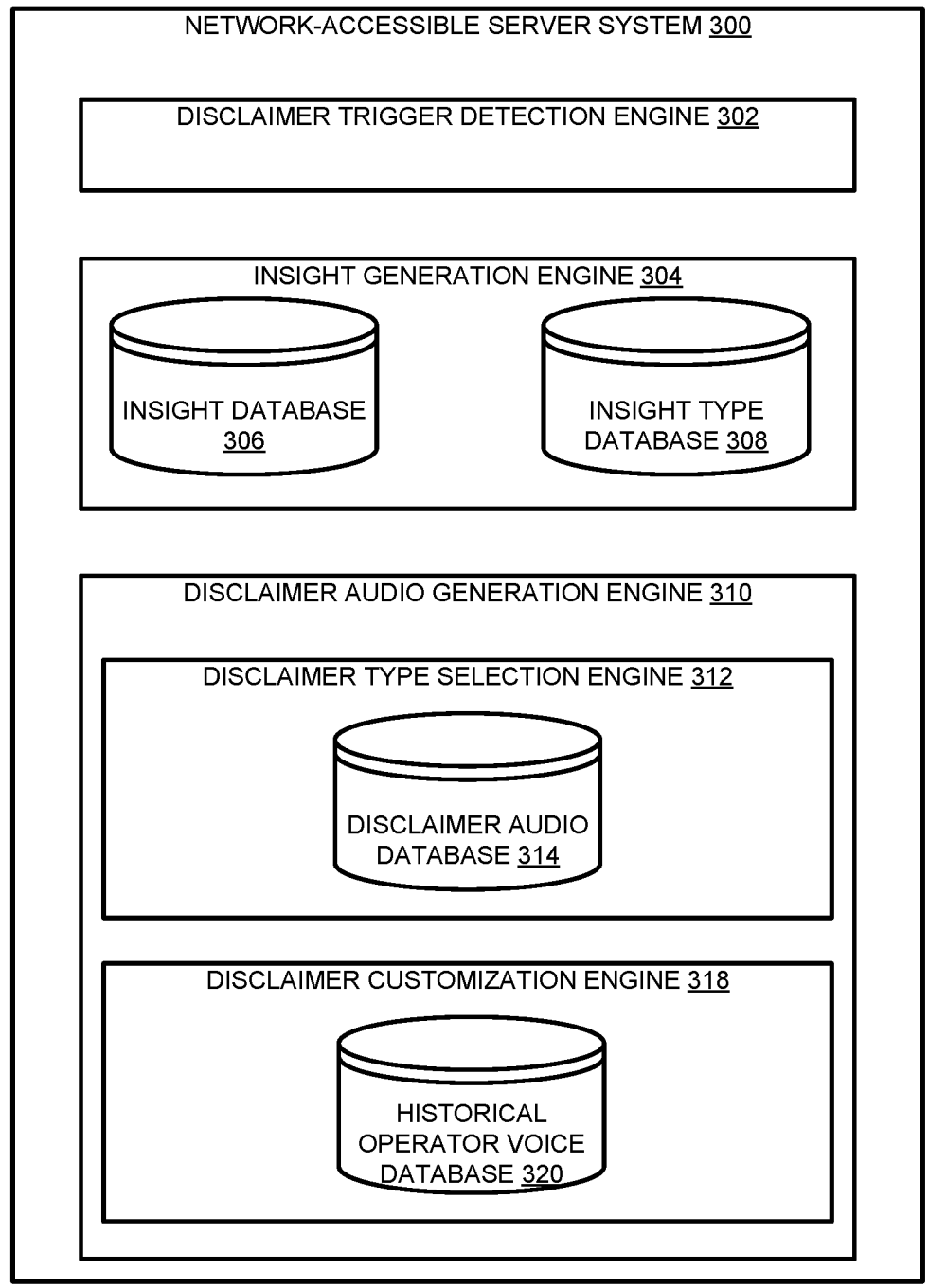
FIG. 3 is a block diagram of an example network-accessible server system 300

FIG. 3 is a block diagram 300 of an example network-accessible server system 300. As noted above, the network-accessible server system 300 can perform various processing tasks to generate curated audio content as described herein.

The network-accessible server system 300 can include a disclaimer trigger detection engine 302. The disclaimer trigger detection engine 302 can monitor and detect trigger(s) to initiate various tasks. A trigger can include an indication to track/monitor the conversation between the operator and the client. This can include identifying a key word/phrase spoken by the client/operator, an indication provided by the operator, etc. Responsive to identifying such a trigger, the network-accessible server system 300 can monitor operator characteristics/features and derive insights to modify the disclosure.

Another example trigger can include a trigger to initiate generation of the curated audio content. Examples of such a trigger can include detecting an indication by the operator to initiate playback of the curated audio content, detection of keyword(s) to initiate the audio, etc. The system 300 can process data relating to the conversation between the client/operator to determine whether the trigger is detected.

The network-accessible server system 300 can include an insight generation engine 304. The insight generation engine 304 can process the client voice and derive insights relating to the audio. For instance, the insight generation engine 304 can compare client voice characteristics with insight types stored in an insight type database 308 to identify insights relating to the client voice. As an example, the derived insight types can relate to an estimated age of the client, a speech speed/cadence, an emotional state, an ambient noise level, etc.

The insight generation engine 304 can process features of the client to derive levels/values associated with each insight type. For example, the insight generation engine 304 can process a set of rules/conditions relating to each insight type (e.g., speech speed of the operator) to derive a value relating to that insight type (e.g., two words spoken by the operator in one second). The insight generation engine 304 can derive the insights using rules, neural networks, machine learning, artificial intelligence, etc. The derived insights relating to the client can be maintained in an insight database 306.

In some embodiments, the insight generation engine 304 can generate insights relating to any of the client audio and/or the operator audio. In these embodiments, the system can generate multiple sets of insights and utilize any of the insights in generation of the curated audio content. For instance, the system can modify audio content using insights generated from both the client audio and operator audio to generate the curated audio content that corresponds to features of both the client audio and operator audio.

The network-accessible server system 300 can include a disclaimer audio generation engine 310. The disclaimer audio generation engine 310 can identify relevant disclaimer audio, incorporate the operator voice into the disclaimer audio, and/or modify the disclaimer audio to include the derived insights into the disclaimer audio. The disclaimer audio generation engine 310 can generate curated audio content (or disclaimer audio) on demand (e.g., in real-time or near real-time) responsive to identify a relevant trigger.

The disclaimer audio generation engine 310 can identify a first disclaimer audio type using a disclaimer type selection engine 312. The disclaimer type selection engine 312 can retrieve disclaimer audio included in a disclaimer audio database 314 that is relevant to a present communication between the client and operator. For example, the disclaimer type selection engine 312 can process words in the communication to identify specific disclaimer audio data. The disclaimer audio included in disclaimer audio database 314 can include rules/keywords that, if identified, trigger retrieval of corresponding disclaimer audio. In another instance, the operator can identify/select specific disclaimer audio based on the communication with the client.

The disclaimer audio generation engine 310 can process the selected disclaimer audio to incorporate previously-stored operator voice data into the disclaimer audio. For instance, the words of the selected disclaimer audio can be matched with corresponding words of the operator stored in a historical operator voice database 320. The historical operator voice database 320 can maintain a listing of voice data relating to the operator (or any number of voices) and associated words corresponding to the voice data. While the voice of the operator is used as an example, the present embodiments can incorporate a voice of any voice actor or any computer-generated voice, for example.

The disclaimer audio that incorporates the voice data of the operator can be customized in a disclaimer customization engine 318. The disclaimer customization engine 318 can implement generative voice model(s) to customize the disclaimer audio to incorporate the insights derived for the client. For example, the disclaimer audio can be customized based on a set of customization rules associated with each insight type. In this example, the disclaimer customization engine 318 can modify one or more characteristics of the disclaimer audio based on a rule associated with an insight type and a derived insight relating to the client voice.

As an illustrative example, if the insight generation engine 304 identifies that a speed of speech of a client has an average of 110 words a minute, the disclaimer customization engine 318 can update the disclaimer audio features to playback at a pace/speed that corresponds with 110 words a minute, the speed in which the client is speaking. As another illustrative example, if the insight generation engine 304 identifies that a background (ambient) noise of the client has an identified value (measured in a value corresponding to volume, decibels, etc.), the disclaimer customization engine 318 can update the disclaimer audio features to increase the volume by a corresponding volume so that the client can hear the disclosure.

The disclaimer customization engine 318 can incorporate a series of rules to modify the disclaimer audio based on values derived relating to insights of the client speech. For instance, rules can provide instructions to modify various features of the disclaimer audio based on the derived insights in a real-time or near real-time manner.

The customized disclaimer audio can be presented/played back to the client device that includes the features corresponding to the insights of the client.

In some embodiments, the network-accessible server system 300 can further customize the disclaimer audio based on an indication from the client that they have difficulty in understanding the disclaimer audio. For example, responsive to detecting that the client has said "say that again" or "I did not get that," relating to the disclaimer audio, the disclaimer customization engine 318 can further modify the disclaimer audio to assist in clearing the audio. This can include raising an audio volume or slowing a speed of the disclaimer audio, for instance.

In some embodiments, the disclaimer customization engine 318 can incorporate feedback from previous instances of customized disclaimer audio to increase accuracy of the customized disclaimer audio. For example, after each instance of providing customized disclaimer audio, the client may provide feedback (verbally, via a keypad on the client device, etc.) relating to their experience relating to playback of the customized disclaimer audio. In such an instance, the disclaimer customization engine 318 can prioritize highest rated instances of customized disclaimer audio and incorporate features of the previous instances of customized disclaimer audio into a present customization of disclaimer audio.

In some embodiments, portions of the processing can be performed in real-time or near real-time, while other tasks can be previously performed to increase efficiency in performing a disclaimer audio customization process. For instance, prior to generating the customized disclaimer audio, the operator voice can be stored. The insights relating to features of the client audio can be generated as the operator is communicating to the client in real-time or near real-time. Further, the processing of the insights and disclaimer audio to generate the customized disclaimer audio can be generated on demand (e.g., responsive to detecting a trigger).

Figure 4:
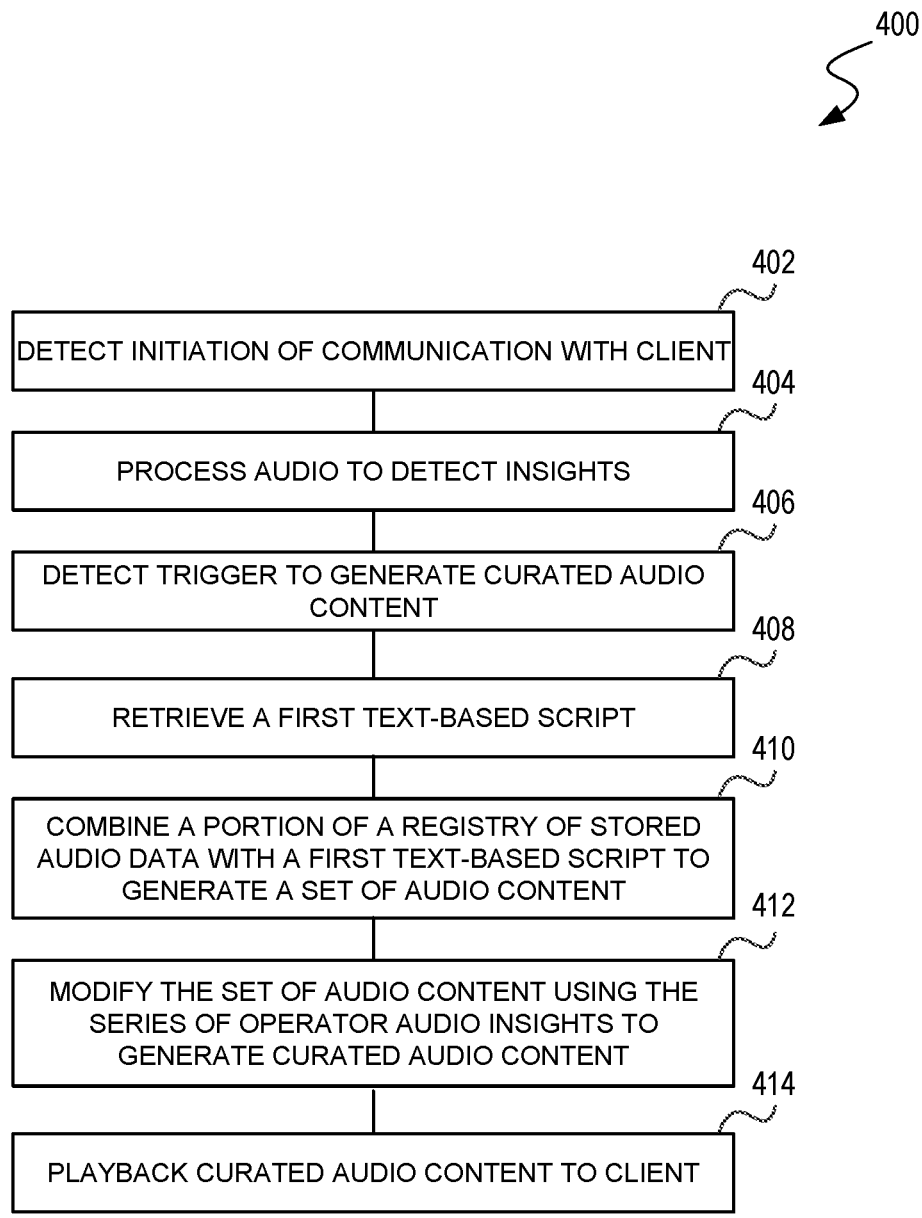
FIG. 4 is a flow process of an example method for generating on demand curated audio content.

FIG. 4 is a flow process 400 of an example method for generating on demand curated audio content. The curated audio content can include audio content that is modified based on insights derived relating to the client. The curated audio content can include disclaimer audio incorporating stored voice data of the operator, for example.

The method can include detecting an initiation of an electronic communication between a client via a client device and an operator via an operator device (block 402). The electronic communication can include a phone call initiated by the client device. The client can initiate the phone conversation to have a task performed (e.g., enroll in a product offered by an entity) by the operator associated with the entity.

In some embodiments, the method can include storing the audio outputting from the operator device in the registry of stored audio data. The method can also include processing the audio outputting from the operator device to identify words included in the audio outputting from the operator device, wherein the audio outputting from the operator device comprises the portion of the registry of stored audio data that is combined with the text-based script to generate the set of audio content.

The method can also include, responsive to detecting the initiation of the electronic communication, processing audio outputting from the operator device to derive a series of audio insights relating to audio of the client (block 404). The insights relating to the audio of the client can include detecting features of the client voice and/or background noise of the client voice. In some instances, the system can detect insights relating to the client and/or the operator and utilize any of these insights in generation of the curated audio content.

In some embodiments, the method can include processing the audio outputting from the client device to identify a set of characteristics relating to the audio of the client, each of the set of characteristics relating to an insight type. The method can also include, for each characteristic of the set of characteristics, mapping each characteristic to a corresponding insight type. The method can also include, for each insight type of the series of insight types, generating an insight included in the series of client audio insights by processing each characteristic with a rule associated with each corresponding insight type.

In some embodiments, the series of client audio insights include any of: a volume level of the audio outputting from the client device, a background noise level of the audio outputting from the client device, a determined age of the client, a detected speech cadence of the client, and a detected emotional state of the client.

The method can also include detecting a first triggering event to generate curated audio content (block 406). The first triggering event can allow for generation of on demand curated audio content. In some embodiments, the first triggering event includes any of an indication provided by the operator device to initiate generation of the curated audio content or detecting a keyword included in the audio outputting from the operator device.

The method can also include retrieving a first text-based script (block 408). The text-based script can include a set of text relating to mandated words to be played back to the client device (e.g., disclaimer language).

In some embodiments, the method can include monitoring audio data transmitted in the electronic communication between the client via the client device and the operator via the operator device to identify an audio content type indicator. The method can also include, responsive to identifying the audio content type indicator, selecting the first text-based script included in a library of text-based scripts by mapping the audio content type indicator to the first text-based script.

The method can also include, responsive to detecting the first triggering event, combining a portion of a registry of stored audio data with a first text-based script to generate a set of audio content (block 410).

The method can also include modifying the set of audio content using the series of client audio insights to generate curated audio content (block 412). In some embodiments, the method can include processing each insight included in the series of client audio insights using a generative voice model to modify at least one feature of the set of audio content according to a curation rule that corresponds to each insight.

The method can also include initiating playback of the curated audio content to the client device via the electronic communication (block 414).

In some embodiments, the method can include, responsive to detecting a completion of playback of the curated audio content, transmitting a request for feedback to the client device. The method can also include receiving a set of requested feedback from the client device. The method can also include storing the set of requested feedback and the associated curated audio content in a curated audio content registry, wherein curated audio content with requested feedback exceeding a threshold rating level is configured to be utilized in generation of subsequent instances of curated audio content.

In some embodiments, the method can include detecting an indication in audio outputting from the client device that the client has failed to comprehend audio included in the curated audio content. The method can also include, responsive to detecting the indication in audio outputting from the client device that the client has failed to comprehend audio included in the curated audio content, modify a volume level and/or a speed of playback of the curated audio content.

Example Device Implementation Overview

Figure 5:
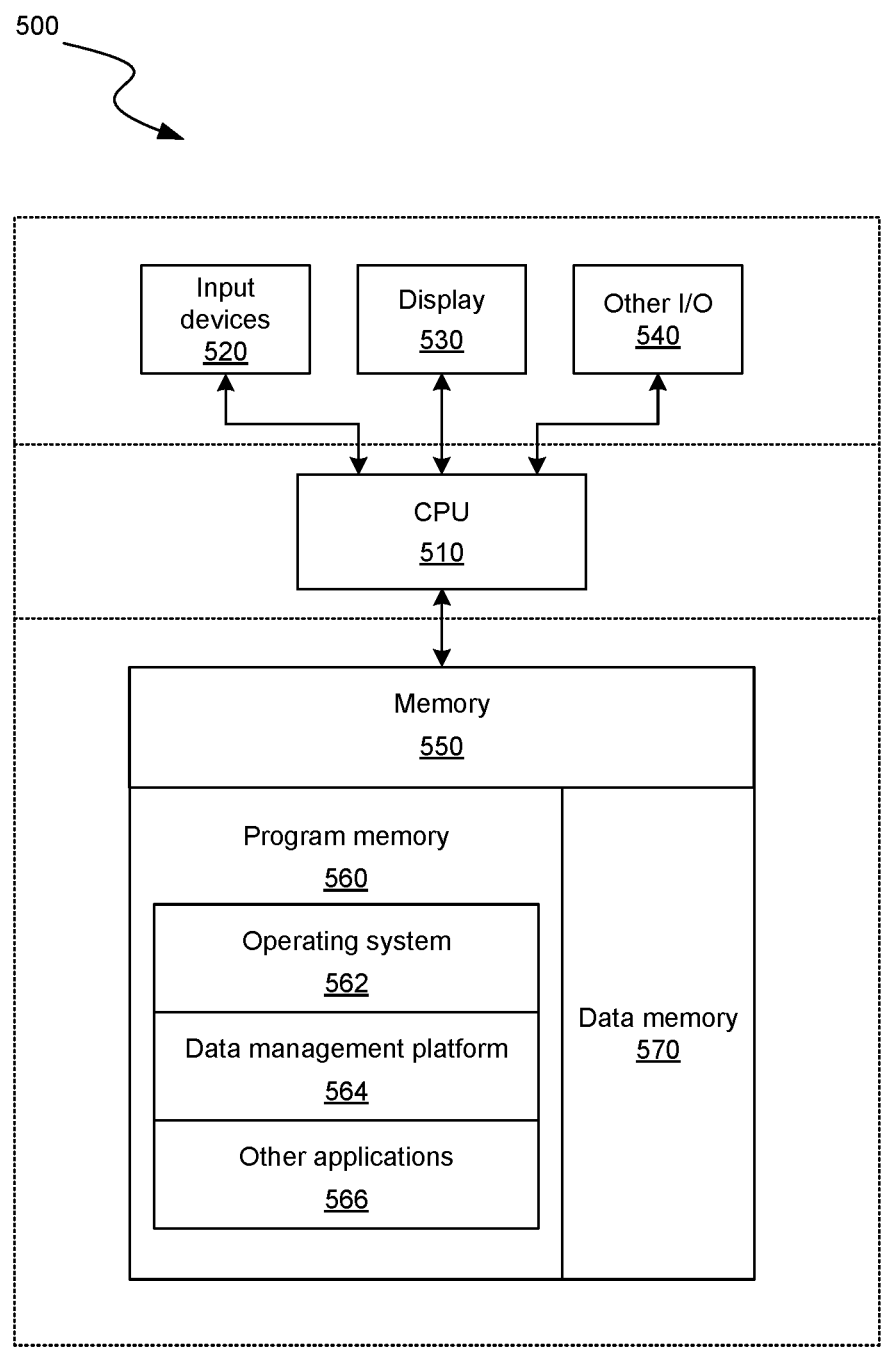
FIG. 5 is a block diagram illustrating an overview of devices on which some implementations of the present embodiments can operate.

FIG. 5 is a block diagram illustrating an overview of devices on which some implementations of the present embodiments can operate. The devices can comprise hardware components of a device 500, such as a client device or network-accessible server system as described herein.

Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a person operating the device 500. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 500 can utilize the communication device to distribute operations across multiple network devices.

The CPU 510 can have access to a memory 550. A memory can include one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software. Memory 550 can also include data memory 570 that can include various information as described in this patent document, which can be provided to the program memory 560 or any element of the device 500. The program memory 560 can include a data management platform 564 and other applications 566 capable of performing the processing tasks as described herein.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in the present Figures and/or in the various embodiments described in this patent document.

Those skilled in the art will appreciate that the components illustrated in FIGS. 1-5 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways.

Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A Non-transitory computer-readable storage medium storing instructions that, when executed by a computing system, cause the computing system to perform a process for generating on-demand curated audio content for an electronic communication, the process comprising: detecting an initiation of the electronic communication between a first participant of the electronic communication via a first device and a second participant of the electronic communication via a second device;
    responsive to detecting the initiation of the electronic communication, deriving characteristics of the first participant and/or characteristics of an environment in which the first device is operating by processing audio output from the first device;
    generating curated audio content by determining and applying, for one or more of the characteristics of the first participant and/or characteristics of the environment, an audio customization A) configured for the defined characteristics and/or B) configured for the environment; and
    causing playback of the curated audio content on the second device for the electronic communication.

2. The Non-transitory computer-readable storage medium of claim 1, wherein the process further comprises:
    processing the audio output from the first device to identify a set of characteristics relating to the output audio;
    for each characteristic of the set of characteristics, mapping each characteristic to a corresponding type; and
    selecting, for each type, a corresponding rule, wherein the generating the curated audio content is performed by applying the selected rules.

3. The Non-transitory computer-readable storage medium of claim 1, wherein the characteristics of the first participant and/or characteristics of an environment include one or more of:
    a volume level of the audio output from the first device, a background noise level of the audio output from the first device, a determined age of a user of the first device, a detected speech cadence of the user of the first device, a detected emotional state of the user of the first device, or any combination thereof.

4. The Non-transitory computer-readable storage medium of claim 1, wherein the process further comprises:
    processing the audio, output from the second device, to identify words included in the audio output from the second device, wherein the audio output from the second device is based on a text-based script specified to generate the audio output from the second device.

5. The Non-transitory computer-readable storage medium of claim 1, wherein the generating the curated audio is in response to A) an indication provided by the second device to initiate generation of the curated audio content or B) detecting a keyword included in 1) audio output from the second device or 2) the audio output from the first device.

6. The Non-transitory computer-readable storage medium of claim 1, wherein the process further comprises: monitoring audio data transmitted in the electronic communication between the first device and the second device to identify an audio content type indicator; and
    responsive to identifying the audio content type indicator, selecting a text-based script included in a library of text-based scripts by mapping the audio content type indicator to the text-based script, wherein the selected text-based script is used to generate a response to the audio output by the first device.

7. The Non-transitory computer-readable storage medium of claim 1, wherein the generating curated audio content comprises: processing one or more of the characteristics, of the first participant and/or characteristics of an environment in which the first device is operating, using a generative voice model to modify at least one audio content feature according to a curation rule corresponding to the one or more of the characteristics.

8. The Non-transitory computer-readable storage medium of claim 1, wherein the process further comprises:
    providing, in response to a detection of completion of playback of the curated audio content, a requested for feedback; receiving the requested feedback; and
    storing the received feedback and the associated curated audio content in a curated audio content registry, wherein curated audio content with requested feedback exceeding a threshold rating level is configured to be utilized in generation of subsequent instances of curated audio content.

9. A method for generating on-demand curated audio content for an electronic communication, the method comprising:
  detecting an initiation of the electronic communication between a first participant of the electronic communication via a first device and a second participant of the electronic communication via a second device;
  responsive to detecting the initiation of the electronic communication, deriving characteristics of the first participant and/or characteristics of an environment in which the first device is operating by processing audio output from the first device;
  generating curated audio content by determining and applying, for one or more of the characteristics of the first participant and/or characteristics of the environment, an audio customization A) configured for the defined characteristics and/or B) configured for the environment; and
  causing playback of the curated audio content on the second device for the electronic communication.

10. The method of claim 9, further comprising:
  processing the audio output from the first device to identify a set of characteristics relating to the output audio;
  for each characteristic of the set of characteristics, mapping each characteristic to a corresponding type; and
  selecting, for each type, a corresponding rule, wherein the generating the curated audio content is performed by applying the selected rules.

11. The method of claim 9, wherein the characteristics of the first participant and/or characteristics of an environment include one or more of: a volume level of the audio output from the first device, a background noise level of the audio output from the first device, a determined age of a user of the first device, a detected speech cadence of the user of the first device, a detected emotional state of the user of the first device, or any combination thereof.

12. The method of claim 9, wherein the generating the curated audio is in response to A) an indication provided by the second device to initiate generation of the curated audio content or B) detecting a keyword included in 1) audio output from the second device or 2) the audio output from the first device.

13. The method of claim 9, wherein the generating curated audio content comprises:
  processing one or more of the characteristics, of the first participant and/or characteristics of an environment in which the first device is operating, using a generative voice model to modify at least one audio content feature according to a curation rule corresponding to the one or more of the characteristics.

14. The method of claim 9, further comprising:
  providing, in response to a detection of completion of playback of the curated audio content, a requested for feedback;
  receiving the requested feedback; and
  storing the received feedback and the associated curated audio content in a curated audio content registry, wherein curated audio content with requested feedback exceeding a threshold rating level is configured to be utilized in generation of subsequent instances of curated audio content.

15. A computing system for generating on-demand curated audio content for an electronic communication, the computing system comprising:
  one or more processors; and
  one or more memories storing instructions that, when executed by the one or more processors, cause the computing system to perform a process comprising:
    detecting an initiation of the electronic communication between a first participant of the electronic communication via a first device and a second participant of the electronic communication via a second device;
    responsive to detecting the initiation of the electronic communication, deriving characteristics of the first participant and/or characteristics of an environment in which the first device is operating by processing audio output from the first device;
    generating curated audio content by determining and applying, for one or more of the characteristics of the first participant and/or characteristics of the environment, an audio customization A) configured for the defined characteristics and/or B) configured for the environment; and
    causing playback of the curated audio content on the second device for the electronic communication.

16. The computing system of claim 15, wherein the process further comprises:
  processing the audio output from the first device to identify a set of characteristics relating to the output audio;
  for each characteristic of the set of characteristics, mapping each characteristic to a corresponding type; and
  selecting, for each type, a corresponding rule, wherein the generating the curated audio content is performed by applying the selected rules.

17. The computing system of claim 15, wherein the characteristics of the first participant and/or characteristics of an environment include one or more of: a volume level of the audio output from the first device, a background noise level of the audio output from the first device, a determined age of a user of the first device, a detected speech cadence of the user of the first device, a detected emotional state of the user of the first device, or any combination thereof.

18. The computing system of claim 15, wherein the generating the curated audio is in response to A) an indication provided by the second device to initiate generation of the curated audio content or B) detecting a keyword included in 1) audio output from the second device or 2) the audio output from the first device.

19. The computing system of claim 15, wherein the generating curated audio content comprises:
  processing one or more of the characteristics, of the first participant and/or characteristics of an environment in which the first device is operating, using a generative voice model to modify at least one audio content feature according to a curation rule corresponding to the one or more of the characteristics.

20. The computing system of claim 15, wherein the process further comprises:
  providing, in response to a detection of completion of playback of the curated audio content, a requested for feedback;
  receiving the requested feedback; and
  storing the received feedback and the associated curated audio content in a curated audio content registry, wherein curated audio content with requested feedback exceeding a threshold rating level is configured to be utilized in generation of subsequent instances of curated audio content.

\* \* \* \* \*